United States Patent [19]

Hauris et al.

[11] Patent Number: 5,422,883
[45] Date of Patent: Jun. 6, 1995

[54] CALL SETUP AND CHANNEL ALLOCATION FOR A MULTI-MEDIA NETWORK BUS

[75] Inventors: Jon F. Hauris; Dennis M. Kalajainen, both of Manassas; Ronald A. Bowen, Sterling, all of Va.

[73] Assignee: International Business Machines Corporation, Armonk, N.Y.

[21] Appl. No.: 963,301

[22] Filed: Oct. 16, 1992

[51] Int. Cl.⁶ .......................................... H04Q 11/04
[52] U.S. Cl. ...................... 370/62; 370/85.7; 370/95.1; 370/110.1; 379/204; 379/205
[58] Field of Search .............. 370/85.7, 62, 79, 94.2, 370/110.1, 95.1; 379/202, 204, 205

[56] References Cited

U.S. PATENT DOCUMENTS

| | | | |
|---|---|---|---|
| 4,540,850 | 9/1985 | Herr et al. | 370/62 X |
| 4,858,232 | 8/1989 | Diaz et al. | 370/86 |
| 4,955,019 | 9/1990 | Mizuhara et al. | 370/85.7 |
| 4,964,157 | 10/1990 | Aoshima | 379/204 |
| 4,980,886 | 12/1990 | Bernstein | 370/80 |
| 5,014,267 | 5/1991 | Tompkins et al. | 370/62 |
| 5,195,086 | 3/1993 | Baumgartner et al. | 370/62 |
| 5,224,094 | 6/1993 | Maher | 370/62 |

FOREIGN PATENT DOCUMENTS

| | | | |
|---|---|---|---|
| 258514 | 3/1988 | European Pat. Off. | H04L 11/20 |
| 453128 | 10/1991 | European Pat. Off. | H04L 12/56 |
| 0502547 | 9/1992 | European Pat. Off. | H04N 7/15 |

OTHER PUBLICATIONS

Multimedia Conferencing in the Etherphone Environment, Harrick Vin, et al. Oct., 1991.
A Software Architecture for Workstations Supporting Multimedia Conferencing in Packet Switching Networks, Wu-Hon Leung, et al., Apr. 1990.
Multimedia Conferencing on Local Area Networks, Chaim Ziegler, et al., Sep. 1990.
"Software Architecture for Integration of Video Services in the Etherphone System" by P. V. Rangan & D. C. Swinehart; IEEE, Sep. 1991; pp. 1395–1404.

*Primary Examiner*—Douglas W. Olms
*Assistant Examiner*—Russell W. Blum
*Attorney, Agent, or Firm*—Joseph C. Redmond; Lauren C. Bruzzone

[57] ABSTRACT

A method and system for call set-up and channel resource allocation between a plurality of parties in a multi-media conference call that consists of receiving notice that a Sender (the initiator of the conference) wants to commence a video conference. At that point, the number of channels required by the proposed call is determined. Subsequently, each requested participant is identified as available, busy, or no answer. If the receiver is available and sufficient channels are available, the call is set-up and the present members of the conference are notified of what channel each should transmit on and what channel(s) to listen to for the other participants. As each receiver is added, the Sender may conference with the present Receiver. If it is decided at this point, that the receiver will not participate in the conference, the call to that receiver may be terminated, and the procedure continues for other receivers until the full conference is set up. Individuals may leave the conference at any time. When the final two participants hang up, the video conference is terminated.

9 Claims, 2 Drawing Sheets

CALL SETUP AND CHANNEL ALLOCATION FOR A MULTI-MEDIA NETWORK BUS

FIELD OF INVENTION

This invention relates to the area of multi-media conferences, that is, to establishing a conference between multiple participants in which a single network facility is used to transmit voice, video, image, graphics and/or data. More specifically, the invention relates to a method and apparatus designed for use in setting up a multi-media conference call and allocating the channels to be used for that call.

PRIOR ART

The past decades have seen a continuously growing corporate demand for fast, reliable information transfer. Initially, communications were "mono-media", that is, they used only one type of data. Typical examples of such applications are voice transmission over a telephone line and data transmission to a terminal. As technology improved, 100 Mbit/s range high speed networks (such as FDA, DQDB and B-ISBN) were developed. Such networks could support the transmission of considerably more information than previously possible. Such technology enabled, and fed the demand for, multi-media communications which integrated different types of data.

Telephone conferences provide an example of mono-media multi-party communications that are well known. Even today, however, some implementations of phone conferencing have certain drawbacks. In some systems, conferences among more than a certain number of parties must be planned for ahead of time, with the actual set-up of the conference requiring the assistance of a telephone operator. In many systems, a conference must be "joined" or established at one point in time. This results in several problems. If the phone of one of the participants is busy or the participant does not answer in the initial stages of set-up, the only option to the other participants is to continue without that party. Similarly, if a new party wishes to join the conference, if the conference participators realize that another party is required, or if one of the participants is inadvertently dropped from the conference, there is no way for that party to be added to an ongoing conference. Finally, in some conferences, the participants are daisy-chained in order as they are added to the conference. As a result, if one of the participants drops out, others may be forced out as well.

An example of the multi-media equivalent of the phone conference is a video-conference between several people at different locations, where graphics or data are simultaneously shared among participants. Thus, in addition to being able to see and hear the other participants, each participant can also access any the charts and documents under discussion.

In implementing such a multi-media, multiparty conference, several problems need to be overcome. Clearly, the drawbacks that plague the current implementations of telephone conferences should be avoided. At the same time, additional facilities could be added. For example, the implementation should enable the call originator to speak with the call receivers, one at a time, and be able to disconnect one or more of the participants during call setup.

A multi-media, multiparty conference also provides several technical challenges in addition to the implementation requirements outlined above. For example, since multi-media transmissions require much wider communication channels than simple audio transmission, it is clear than ensuring sufficient channel capacity is a significantly greater problem. It is also clear that, given the cost of wideband communications, existing channel capacity should be used in as efficient a manner as possible. Thus, a solution which would entail keeping open channels capable of handling the largest estimated conference would not be satisfactory.

Efficient use of resource is not, however, the entire problem. An optimum solution must also deal with the generic problem of multi-media communications: that is, being able to efficiently transmit both isochronous and packet data (each having significantly different transmission requirements) over communication channels. More specifically, real-time, isochronous information (such as moving images and voice) requires a controlled delay time limit. That is, such data must be considered high priority and guaranteed network bandwidth to insure a consistent and constant communication channel. In contrast, Asynchronous data (such as graphics or documents) can tolerate fluctuating delay times and can be sent in packet format. Essentially, this lower priority data does not require a constant channel. However, care must be taken to insure some channel resources are assigned to asynchronous transmission, in order to avoid such data being totally shut out by the higher priority isochronous transmissions.

Prior art has dealt with multi-media conferencing between pairs of participants or multiple pairs of participants (see, for example, U.S. Pat. No. 4,955,019, Mizuhara, et al., "Multimedia Information Exchanging System and Equipment Therefore"), but does not deal with true multi-participant conferencing. Similarly, prior art has discussed multi-participant conferencing for a specific LAN protocol (see, for example, "Multiple Conferencing in the Etherphone Environment", H. Vin, P. Zellweger, D. Winehard, and P. V. Rangan, 1991 IEEE, Computer Section, October, 1991, pages 69–79), but has not dealt with the problem of multiple types of networks and LANs. (A more generic discussion can be found in "Multimedia Conferencing On Local Area Networks", C. Ziegler and G. Weiss, 1990 IEEE, Computer Section, September, 1990, pages 52–61, which considers management and implementation of multi-media conferencing, however, this paper does not discuss a solution to the requirements its lists.)

OBJECTIVES

Accordingly, it is an object of this invention to create a method by which a multi-party, multi-media conference call may be established, by allocating multiple channels (one per participant) and establishing the communication pathway (Call Setup) among the various participants.

It is a further objective of this invention that, in establishing a call among multiple participants, if an intermediary participant is Busy (participant participating in another communication or conference) or No Answer (participant not responding), the call originator may continue or terminate the conference setup at his discretion.

It is a further objective of this invention to enable participants to be added to and deleted from a conference without affecting any other conference participant.

It is a further objective to make optimal and efficient allocation of available channels and their bandwidth and to establish a conference call in the minimum bandwidth necessary.

It is a further objective of this invention to establish a method which is independent of the wideband and LAN protocols used.

BRIEF DESCRIPTION OF THE INVENTION

The Call Setup and Channel Allocation can be implemented in either hardware or software. For the purposes of this disclosure it is described in terms of a State Machine illustrated in FIG. 2. A state diagram describes states (or tasks). The horizontal lines represent conditions under which one proceeds from one task to another. In a verbal description of a state machine, a transition from State 0:IDLE to State 1, is indicated by IDLE(0-1).

Generally, the state machine waits in the IDLE State (1) until a Sender wants to commence a video conference. At that point the machine will proceed to State 1 (10) where it is determined which Isochronous Channels are available. This is done as follows.

By keeping track of what bandwidth is being used, the state machine determines how much bandwidth and how many channels are available for the present conference. These are then applied to the present channel allocation and call setup. During this step, the actual resources required by the conference is established and only that much of the channel allocated. In this way, no unnecessary channel resource is tied up by the call.

Following state 1 (FIG. 2, 10), the state machine proceeds to state 2 (20) where it determines if the Receiver R(N) is BUSY, NO ANSWER or available for the conference call.

Proceeding with FIG. 2, if R(N) is available and sufficient channels are available, then the state machine will continue to state 4:Call Setup (40). In this state, the present members of the conference are notified of the channel on which each should transmit and the channel(s) used by the other participants to which it should listen.

After state 4 (40), the state machine moves to state 5:Talk (50). At this step, the Sender may conference with the present Receiver R(N). If it is decided at this point, that R(N) will not participate in the conference, the call to R(N) may be disconnected (via State 7:End (70)) and the Call Setup procedure may continue with the other receivers. From State 5:Talk (50), the state machine cycles through states 2 (20), 4 (40), and 5 (50), adding the individual participants one at a time until the full conference is set up. At this point, the video conference will proceed, that is, the participants will begin to transmit and receive along the multi-media channels. Individuals may leave the conference at any time and when the final two participants hang up, the video conference is terminated, the Call is torn down (State 3: channel Tear Down (30), the channels deallocated, and the channels and their bandwidth thrown back into the channel pool and made available for other communications (both Isochronous and Packet).

DETAILED DESCRIPTION OF THE INVENTION

Figure 1:
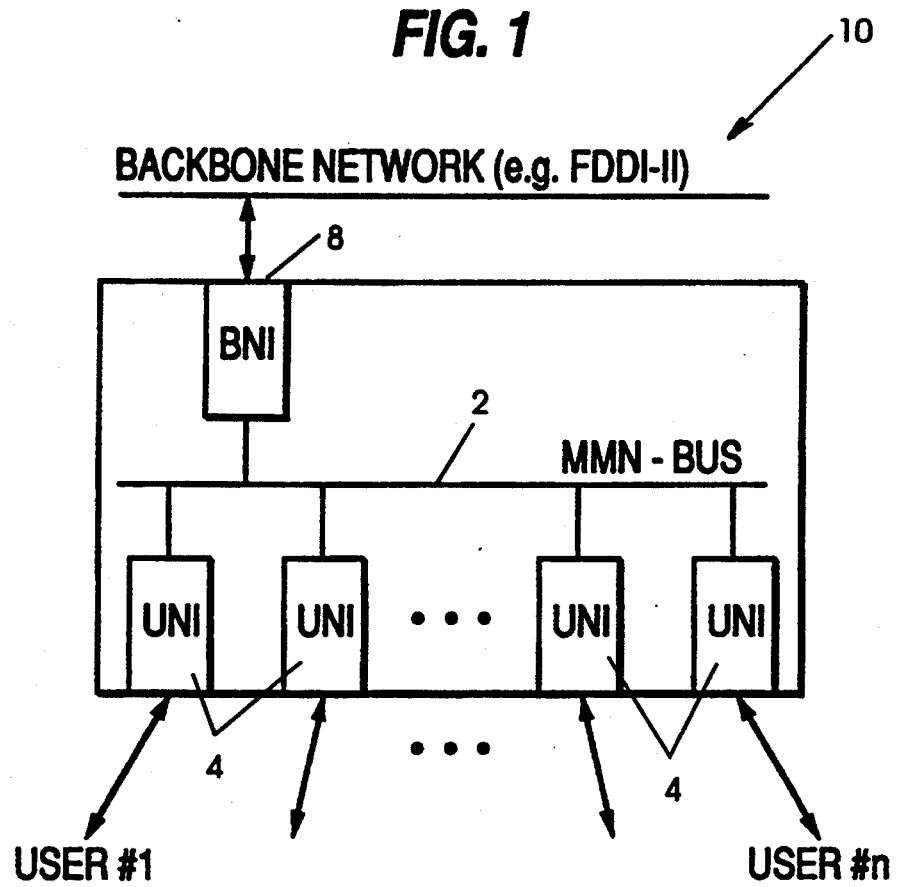
FIG. 1 is a block diagram of a multimedia system including an MMN-Bus.
Figure 2:
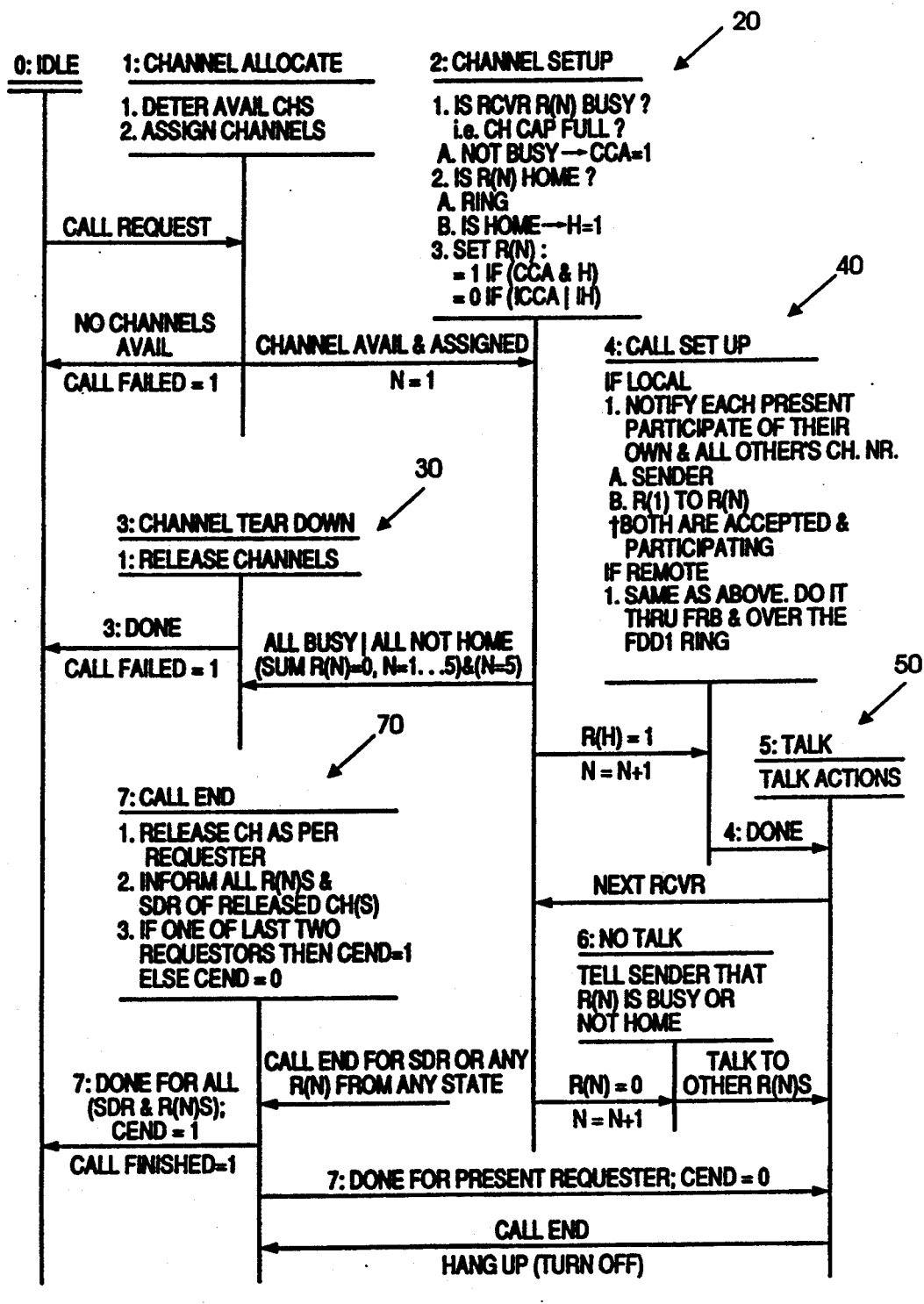
FIG. 2 is a representation of the Call Setup and Channel Allocation State Machine.

FIG. 1 illustrates the environment in which a multimedia, multi-user conference could take place. Referring to FIG. 1, a multi-media network bus (MMN-Bus) (2) distributes high-speed isochronous and packet data to a set of users over multiple user network interfaces (UNIs) (4). The MMN-Bus Controller (MMNC) part of the MMN-Bus and resident on the backbone network interface (BNI) (8), allocates multiple isochronous channels and the packet channel for distribution to the users over the MMN-Bus (2). Thus, remote communications occur over the MMN-Bus (2), through the BNI (8), and across the network to the receiving backbone network interface (10). In addition, the MMN-Bus provides local communication services (LAN-type services) to the local users independent of the backbone network. That is, the UNIs (4) associated with a single MMN-Bus (2) can communicate with each other without using the resources of the backbone network (10). An example of such an MMN-Bus (2) can be found in U.S. patent application, "Multi-Media Network Bus", Bowen, et al., filed Oct. 8, 1992, with common assignee to this invention.

The apparatus and method will be described with relation to a 100 Mbps Fiber Distributed Data Interface-II (FDA-II) backbone network and a 100 Mbps Ethernet Lan (10BaseT Ethernet Network) of up to 64 UNIs. In general, FDA defines a LAN using a fiber optic transmission medium. The extended version of FDA (FDA-II) provides packet oriented services and an Isochronous service.

CALL SETUP and CHANNEL ALLOCATION STATE DESCRIPTIONS

The following list describes each state, the transition conditions, and the transition actions. This will then provide a complete description of the operation and methodology of the Call Setup and Channel Allocation.

Call Setup And Channel Allocation States

State - 0:IDLE

This is the quiescent state. Upon completion of all other states or upon initialization, the machine enters this state.

IDLE(0-1): A transition to Channel Allocate (CA) is made upon the reception of a Call Request signal.

State - 1:CHANNEL ALLOCATE (CA)

This state is entered via a Call Request. Upon entering the state the available channels are determined from the main controller and the channels are allocated to the participants. This allocation depends on the available bandwidth and how many stations are requested. The available communications bandwidth depends on the amount of current traffic. It implements an optimal use of available bandwidth and dynamically allocates the available channels to meet the present call's requirements.

CA(1-0): If no channels or an insufficient number of channels are available, then the machine returns to IDLE with the Call Failed flag set.

CA(1-2): This transition occurs once the channels are assigned. The count flag N is initialized to one.

State - 2:CHANNEL SETUP (CS)

Upon entering state CS, it is determined if the present receiver (i.e., R(N)) is BUSY or NO ANSWER. A BUSY is when R(N)'s channel capacity is full and it cannot accept any more calls. Flag CA is set to 1 if R(N) is not BUSY. NO ANSWER implies that R(N) is not home or is not answering his station. Flag H is set to 1 if R(N) answers. NO ANSWER requires a time out value. If R(N) does not answer within this time limit, he is considered not home and thus a NO ANSWER and flag H is set to 0. The flag R(N) is set if the station is not BUSY (i.e., CA=1) and is home (i.e., H=1). Otherwise R(N) is cleared.

CS(2-3): If all are BUSY or all are NO ANSWER then go to the Channel Tear Down state.

CS(2-6): If the present station, R(N), is BUSY or NO ANSWER then go to the NO TALK state and increment the N count to point to the next receiver.

CS(2-4): This transition is taken if R(N) is not BUSY and is answering (i.e., R(N)=1). The N count is incremented to point to the next receiver.

State - 4:CALL SETUP (CSU)

The following actions are taken when state CSU is entered. These actions are performed for both local and remote communications. The procedures are identical except that the local actions are performed through the User Network Interface (UNI) connections and the remote actions are performed through the Broadband Network Interface (BNI) connection.

Each present participant is notified of their own channel number. This is the channel which they transmit on. They are also notified of each other participant's channel number. This is so that they know What channel to listen to in order to receive the other's communications. On the MMN-Bus system, Bowen, et al., mentioned previously, this notification is performed through the C-State=2 control cycle.

CSU(4-5): When the above enter actions are completed a transition is made to the Talk state.

State - 5:TALK

The Talk state is the steady state operation of the network. It is during this state that the conference communication is carried on. During this state the high level communications protocol is in control and is carrying out the communications. For this implementation, this would be the FDA II protocol. Included in these actions are Service Access Ports (SAPs) that permit the addition of the next participant and termination of a call. These SAPs are described and activated by the Next Rcvr signal and the Call End signal. These signals are discussed in the following two transitions, TALK(5-2) and TALK(5-7).

TALK(5-2): Upon the reception of a Next Rcvr signal a transition is made to the Channel Setup State. The Next Rcvr signal is initiated by the Call Originator by depressing a key which causes an interrupt to the state machine. The purpose of this transition is to add another participant to the conference.

TALK(5-7): Upon the reception of a Call End signal a transition is made to the Call End State. The Call End signal is initiated by any of the participants by depressing a key which causes an interrupt to the state machine. The purpose of this transition is to terminate an individual's participation in the conference.

State - 6:NO TALK (NT)

This state is entered when it has been determined that the present receiver, R(N), is BUSY or NO ANSWER. The Sender is notified as such and can then proceed to adding the other participants or continuing with the conference.

NO TALK(6-5): Upon completion of the NO TALK enter actions, the machine transits to the TALK state. Here the Sender may continue with the conference or include additional participants by activating the Next Rcvr signal.

3:CHANNEL TEAR DOWN (CTD)

Upon entering the CTD state all allocated channels are released and put back into the channel available pool. This occurs at the termination of the conference call (i.e., when all participants end their communication with each other).

CTD(3-0): Upon completion of the CTD enter actions, the machine transits to the IDLE state and the Call Failed flag is set.

State - 7:CALL END (CE)

Upon entering the CE state the allocated channels are released according to the requester that is terminating the call. For example, if participant N=3 is hanging up, then the channel that was allocated to participant N=3 is released. All other stations are notified that this requester is terminating his call. This means that the other participants no longer monitor or receive that channel. In Bowen, et al., MMN-Bus, this notification takes place via the U-State=2 control cycle.

This state is reached in two specific ways: either from the TALK state when a participant is finished with the conference or from any state when a participant needs to leave the conference. If a single participant is hanging up and he is not one of the last two participants, then the CEND (Conference End) flag is cleared. If the requestors are one of the last two participants in the conference and either of them are requesting to hang up, then the CEND flag is set.

CE(7-5): In the situation where a single participant wishes to leave the conference (CEND=0), the remainder of the conferees will want to continue with the conference. In that case the machine transits back to the TALK state.

CE(7-0): In the case where all participants are finished (CEND=1) and the entire conference is to be ended, a transition is made to the IDLE state and the Call Finished flag is set.

One of the novel and innovative aspects of this disclosure is that it controls the dynamic allocation of variable isochronous and packet bandwidths and variable numbers of isochronous channels. The Call Setup and Channel Allocations Method determines the bandwidth that is available and reassigns it dynamically to requesting stations. This includes a redistribution of the number of channels being used and of their individual bandwidth to match the requested channel capacities. The disclosure also provides a method for the graceful inclusion and release of individual participants while continuing the basic call.

It should also be noted that the Call Setup and Channel Allocation Method provide the mechanism to guarantee that appropriate bandwidth is dedicated to video, voice and other types of isochronous data. In the actual allocation, the isochronous channels are given priority on the bus over any packet transfers.

While this invention has been described in connection with what is presently considered to be the preferred embodiments, it is understood that the invention is not limited to the disclosed embodiment. On the contrary, the invention is intended to cover various modifications and equivalent arrangements included within the spirit and scope of the appended claims.

For example, the above invention has been described with reference to an FDA-II high speed network and an Ethernet UNI. It would be clear to one skilled in the art that other high speed networks stands such as Fiber Channel Standard, DQDB, and B-ISBN may also be used in place of FDA-II. Alternate UNI are Token Ring and IEEE 802.9. The invention may also be used with high speed networks and UNIs with different speed than those specified.

Similarly, while the above invention has been described for a video conference, those skilled in the art will see that it may also be used in other multi-participant communications such a video-classrooms.

We claim:

1. A method of call set-up and allocation for a multimedia exchange of communications among a plurality of parties, said parties connected by a backbone network and a plurality of local area networks, said method comprising the steps of:
   a) waiting in a quiescent state;
   b) receiving a call request from a first participant, said call request identifying other participants for local or remote communication, the former conducted through the local area network and the latter connected through the backbone network;
   c) entering a channel allocate: state and during said channel allocate state:
      determining the number of variable isochronous channels and variable packet and isochronous bandwidth required for communication among said first participant and all of said other participants using a state machine;
      determining the number of available channels and bandwidth using the state machine;
      dynamically allocating and reassigning the required number of channels to said conference using the state machine to meet the needs of the call request, if said number of channels available is at least equal to said number of channels required; and
      returning to said idle state if said number of channels available is less than said number of channels required;
   d) choosing one of said other participants and determining whether said chosen participant is busy", no answer" or "clear";
   e) if said chosen participant is "clear":
      assigning a channel to said chosen participant;
      notifying said chosen participant of a channel number associated with said assigned channel and channel numbers assigned to the first participant and any other participant;
   f) if said chosen participant is "busy" or "no answer", identifying to said first participant the state of said chosen participant;
   g) repeating steps c, d, e, and f a plurality of times until each of said other participants has been chosen; and
   h) entering a talk state and during said talk state:
      communicating among said first participant and all of said other "clear" participants, said communicating consisting of transmitting and receiving among said first participant and all of said other "clear" participants over said assigned channels;
      receiving an additional call request from said first participant identifying one or more additional participants;
      repeating steps c, d, e, and f until each of said additional participants has been chosen; and
      reentering said talk state.

2. A method of call set-up and allocation as in claim 1 comprising the following additional steps after step e:
   entering an initial talk state during which said first participant and said clear chosen participant can communicate using channels corresponding to said assigned channel number;
   continuing to step g of claim 1 if said first participant indicates that said clear chosen participant should remain in the call; and
   releasing the assigned channel for said clear chosen participant if said first participant indicates that said clear chosen participant should not remain in the call and returning to step g of claim 1.

3. A method as in claim 1, comprising in addition, releasing said assigned channel when one of said clear participants indicates termination of communication between said clear participant and said other participants.

4. A method as in claim 1, comprising in addition, releasing all of said assigned channels when said first participant indicates termination of communications.

5. A system of call set-up and allocation for a multimedia exchange of communications among a plurality of parties, said parties connected by a backbone network and a plurality of local area networks, said system comprising:
   a) means for waiting in a quiescent state;
   b) means for receiving a call request from a first participant said call request identifying other participants for local or remote communications, the former conducted through the local area network and the latter conducted through the backbone network;
   c) means for entering a channel allocate state, said means for entering an allocation state comprising:
      means for determining the number of variable isochronous channels and variable packet and isochronous bandwidth required for communication among said first participant and all other said participants using a state machine;
      means for determining the number of available channels and bandwidth using the state machine;
      means for dynamically allocating and reassigning the required number of channels to said conference using the state machine to meet the needs of the call request including guaranteeing bandwidth for isochronous data, if said number of channels available is at least equal to said number of channels required; and
      means for returning to said idle state if said number of channels available is less than said number of channels required;
   d) means for choosing one of said other participants and determining whether said chosen participant is "busy", "no answer" or "clear";
   e) means for assigning a channel to said chosen participant, if said chosen participant is "clear" and means for notifying said chosen participant of a channel number associated with said assigned channel and channel numbers assigned to the first participant and any other participant, if said chosen participant is "clear";
   f) means for identifying to said first participant, the state of said chosen participant, said identification occurring if said chosen participant is "busy" or "no answer"; and g) means for entering a talk state, during which said first participant and all of said other "clear" participants transmit and receive among themselves over channels corresponding to said assigned channel numbers.

6. A system of call set-up and allocation for a multimedia exchange of communications among a plurality of parties, said parties connected by a backbone network and a plurality of local area networks, said system comprising:

a) means for waiting in a quiescent state;

b) means for receiving a call request from a first participant said call request identifying other participants for local or remote communication, the former conducted through the local area network and the latter conducted through the backbone network;

c) means for entering a channel allocate state, said means for entering an allocation state comprising:

means for determining the number of variable isochronous channels and variable packet and isochronous bandwidth required for communication among said first participant and all of said other participants using a state machine;

means for determining the number of available channels and bandwidth using the state machine;

means for dynamically allocating and reassigning the required number of channels to said conference using the state machine to meet the needs of the call request including guaranteeing bandwidth for isochronous data, if said number of channels available is at least equal to said number of channels required; and means for returning to said idle state if said number of channels available is less than said number of channels required;

d) means for choosing one of said other participants and determining whether said chosen participant is "busy", "no answer" or "clear";

e) means for assigning a channel to said chosen participant, if said chosen participant is "clear" and means for notifying said chosen participant of a channel number associated with said assigned channel and channel numbers assigned to the first participant and any other participant, if said chosen participant is "clear";

f) means for identifying to said first participant the state of said chosen participant, said identification occurring if said chosen participant is "busy" or "no answer";

g) means for entering a talk state, during which said first participant and all of said other "clear" participants transmit and receive among themselves over channels corresponding to said assigned channel numbers;

h) means for receiving an additional call request from said first participant identifying one or more additional participants;

i) means for reentering said channel allocate state, said means for reentering said allocation state comprising:

means for determining the number of channels required for an additional call among said first participant and all of said additional participants;

means for determining the number of available channels;

means for adding the required number of channels to said conference, if said number of channels available is at least equal to said number of channels required; and means for returning to said talk state if said number of channels available is less than said number of channels required;

j) means for choosing one of said additional participants and determining whether said chosen additional participant is "busy", "no answer" or "clear";

k) means for assigning an additional channel to said chosen additional participant, if said chosen additional participant is "clear" and means for notifying said chosen additional participant of a channel number associated with said assigned additional channel and channel numbers assigned to the first participant and any other participant, if said chosen additional participant is "clear"; and l) means for identifying to said first participant the state of said chosen additional participant, said identification occurring if said chosen additional participant is "busy" or "no answer"; and m) means for reentering said talk state.

7. A system of call set-up and allocation as in claim 6 comprising, in addition:

means for entering an initial talk state during which said first participant and said clear chosen participant can communicate using channels corresponding to said assigned channel number;

means for continuing to step g of claim 6 if said first participant indicates that said clear chosen participant should remain in the call;

means for releasing the assigned channel for said clear chosen participant if said first participant indicates that said clear chosen participant should not remain in the call and subsequently continuing to step g of claim 6.

8. A system as in claim 6, comprising in addition, means for releasing said assigned channel when one of said clear participants indicates termination of communication between said clear participant and said other participants.

9. A system as in claim 6, comprising in addition, means for releasing all of said assigned channels when said first participant indicates termination of communications.

* * * * *